(12) United States Patent
Franke et al.

(10) Patent No.: US 6,805,823 B2
(45) Date of Patent: Oct. 19, 2004

(54) RESILIENT BIODEGRADABLE PACKAGING MATERIALS

(75) Inventors: Hans G. Franke, Bryan, TX (US); Donald R. Bittner, Irving, TX (US)

(73) Assignee: Amylex Corporation, Incline Village, NV (US)

( * ) Notice: Subject to any disclaimer, the term of this patent is extended or adjusted under 35 U.S.C. 154(b) by 0 days.

(21) Appl. No.: 10/000,590

(22) Filed: Oct. 25, 2001

(65) Prior Publication Data

US 2002/0135097 A1 Sep. 26, 2002

Related U.S. Application Data

(63) Continuation of application No. 08/784,859, filed on Jan. 15, 1997, now abandoned, which is a continuation-in-part of application No. 08/421,720, filed on Apr. 14, 1995, now Pat. No. 5,766,529.

(51) Int. Cl.[7] .............................................. B29C 47/00
(52) U.S. Cl. ................. 264/151; 264/176.1; 264/210.2; 264/211.11; 264/211.23; 264/288.4; 264/291; 106/145.1; 524/47; 524/48
(58) Field of Search ............................. 264/151, 176.1, 264/210.2, 211.11, 211.23, 288.4, 291, 292, 143; 106/145.1, 154.1, 211, 213; 524/47, 48

(56) References Cited

U.S. PATENT DOCUMENTS

| | | | |
|---|---|---|---|
| 3,137,592 A | 6/1964 | Protzman et al. | 127/32 |
| 3,769,397 A | 10/1973 | Cook et al. | 264/209 |
| 3,931,068 A | 1/1976 | Clendinning et al. | 260/7.5 |
| 4,076,846 A | 2/1978 | Nakatsuka et al. | 426/62 |
| 4,079,025 A | 3/1978 | Young et al. | 260/17.4 |
| 4,108,590 A | 8/1978 | Kontz | 425/466 |
| 4,125,495 A | 11/1978 | Griffin | 260/17.4 |
| 4,133,784 A | 1/1979 | Otey et al. | 260/17.4 |
| 4,337,181 A | 6/1982 | Otey et al. | 523/128 |
| 4,432,718 A | 2/1984 | Wurzer | 425/466 |
| 4,454,268 A | 6/1984 | Otey et al. | 524/47 |
| 4,673,438 A | 6/1987 | Wittwer et al. | 106/126 |
| 4,863,655 A | 9/1989 | Lacourse et al. | 264/53 |
| 5,032,337 A | 7/1991 | Nachtergaele et al. | 264/141 |
| 5,035,930 A | 7/1991 | Lacourse et al. | 428/35.6 |
| 5,043,196 A | 8/1991 | Lacourse et al. | 428/35.6 |
| 5,059,642 A | 10/1991 | Jane et al. | 524/52 |
| 5,087,650 A | 2/1992 | Willett | 524/47 |
| 5,095,054 A | 3/1992 | Lay et al. | 524/47 |
| 5,108,677 A | 4/1992 | Ayres | 264/112 |
| 5,114,656 A | 5/1992 | Dionne et al. | 264/321 |
| 5,158,810 A | 10/1992 | Oishi et al. | 428/35.4 |
| 5,185,382 A | 2/1993 | Neumann et al. | 521/84.1 |
| 5,186,990 A | 2/1993 | Starcevich | 428/35.6 |
| 5,208,267 A | 5/1993 | Neumann et al. | 521/79 |
| 5,248,702 A | 9/1993 | Neumann et al. | 521/84.1 |
| 5,252,271 A | 10/1993 | Jeffs | 264/54 |
| 5,258,430 A | 11/1993 | Bastioli et al. | 524/52 |
| 5,279,658 A | 1/1994 | Aung | 106/154.1 |
| 5,280,055 A | 1/1994 | Tomka | 524/47 |

(List continued on next page.)

FOREIGN PATENT DOCUMENTS

| | | | | |
|---|---|---|---|---|
| CA | 788896 | 7/1968 | | |
| CA | 2199284 | 3/2002 | | C08J/9/232 |
| CA | 2062789 | 9/2002 | | B27N/3/28 |

(List continued on next page.)

*Primary Examiner*—Peter D. Mulcahy
(74) *Attorney, Agent, or Firm*—Bruce W. Slayden, II; Baker Botts L.L.P.

(57) ABSTRACT

Biodegradable starch-based extruded products and methods of manufacturing those products are provided. In particular, extruded starch products processed by compression, stretching or compression and stretching provide excellent flexibility, pliability, dimensional stability, resiliency, abrasion resistance and other properties making them attractive for use as packaging materials.

52 Claims, 1 Drawing Sheet

U.S. PATENT DOCUMENTS

| | | |
|---|---|---|
| 5,288,318 A | 2/1994 | Mayer et al. ............... 106/213 |
| 5,292,782 A | 3/1994 | Bastioli et al. ............... 524/47 |
| 5,306,327 A | 4/1994 | Dingeman et al. ............ 75/313 |
| 5,314,754 A | 5/1994 | Knight ....................... 428/532 |
| 5,317,119 A | 5/1994 | Ayres ......................... 219/734 |
| 5,320,669 A | 6/1994 | Lim et al. ................... 106/157 |
| 5,321,064 A | 6/1994 | Vaidya et al. ................ 524/56 |
| 5,322,866 A | 6/1994 | Mayer et al. ................. 524/47 |
| 5,360,830 A | 11/1994 | Bastioli et al. ............ 521/84.1 |
| 5,362,778 A | 11/1994 | Famili et al. ................. 524/50 |
| 5,384,170 A | 1/1995 | Bastioli et al. ............ 428/34.1 |
| 5,393,804 A | 2/1995 | George et al. .............. 523/128 |
| 5,397,834 A | 3/1995 | Jane et al. ................. 525/54.1 |
| 5,403,875 A | 4/1995 | Bortnick et al. ............... 524/47 |
| 5,409,973 A | 4/1995 | Bastioli et al. ............... 524/53 |
| 5,413,855 A | 5/1995 | Kolaska et al. ........... 428/320.2 |
| 5,427,614 A | 6/1995 | Wittwer et al. ............. 106/213 |
| 5,464,878 A | 11/1995 | Nemphos et al. ............. 521/50 |
| 5,476,621 A | 12/1995 | Kustner ....................... 264/53 |
| 5,506,046 A | 4/1996 | Andersen et al. .......... 428/34.5 |
| 5,508,072 A | 4/1996 | Andersen et al. .......... 428/34.5 |
| 5,512,090 A | 4/1996 | Franke et al. ............. 106/154.1 |
| 5,512,378 A | 4/1996 | Bastioli et al. ............. 428/484 |
| 5,512,617 A | 4/1996 | Ritter et al. ................... 524/47 |
| 5,525,281 A | 6/1996 | Lorcks et al. ............... 264/101 |
| 5,545,450 A | 8/1996 | Andersen et al. .......... 428/34.5 |
| 5,580,624 A | 12/1996 | Andersen et al. .......... 428/34.5 |
| 5,582,670 A | 12/1996 | Andersen et al. ........... 156/242 |
| 5,589,518 A * | 12/1996 | Bastoli et al. ................. 521/55 |
| 5,618,341 A | 4/1997 | Andersen et al. ...... 106/287.35 |
| 5,631,053 A | 5/1997 | Andersen et al. .......... 428/36.4 |
| 5,658,603 A | 8/1997 | Andersen et al. ........... 425/532 |
| 5,660,900 A | 8/1997 | Andersen et al. .......... 428/35.6 |
| 5,660,903 A | 8/1997 | Andersen et al. .......... 428/36.4 |
| 5,660,904 A | 8/1997 | Andersen et al. .......... 428/36.4 |
| 5,662,731 A | 9/1997 | Andersen et al. ........ 106/206.1 |
| 5,665,443 A | 9/1997 | Hata et al. .................. 428/34.9 |
| 5,679,149 A | 10/1997 | Tezuka et al. ............... 106/644 |
| 5,683,772 A | 11/1997 | Andersen et al. .......... 160/36.4 |
| 5,691,014 A | 11/1997 | Andersen et al. .......... 428/34.5 |
| 5,702,787 A | 12/1997 | Andersen et al. .......... 428/36.4 |
| 5,705,203 A | 1/1998 | Andersen et al. ............ 425/407 |
| 5,705,238 A | 1/1998 | Andersen et al. .......... 428/34.5 |
| 5,705,239 A | 1/1998 | Andersen et al. .......... 428/34.5 |
| 5,705,242 A | 1/1998 | Andersen et al. .......... 428/36.4 |
| 5,705,536 A | 1/1998 | Tomka ....................... 521/84.1 |
| 5,709,913 A | 1/1998 | Andersen et al. .......... 428/34.5 |
| 5,716,675 A | 2/1998 | Andersen et al. ............ 427/384 |
| 5,736,209 A | 4/1998 | Andersen et al. .......... 428/36.4 |
| 5,738,921 A | 4/1998 | Andersen et al. .......... 428/36.4 |
| 5,766,525 A | 6/1998 | Andersen et al. .......... 264/40.1 |
| 5,776,338 A | 7/1998 | Mari .......................... 210/252 |
| 5,783,126 A | 7/1998 | Andersen et al. ........... 264/102 |
| 5,786,080 A | 7/1998 | Andersen et al. ............ 428/357 |
| 6,579,149 B2 | 6/2003 | Lebel et al. .................... 451/6 |

FOREIGN PATENT DOCUMENTS

| | | | |
|---|---|---|---|
| DE | 659706 | 6/1938 | |
| DE | 420593 | 3/1967 | ............. B29F/3/04 |
| DE | 1479351 | 4/1969 | ........... B29C/17/00 |
| DE | 4424946 A1 | 1/1996 | ........... B29C/47/86 |
| DE | 29707060 | 7/1997 | |
| EP | 0376201 A1 | 12/1989 | ............. C08L/3/00 |
| EP | 0431203 A1 | 11/1993 | ............. A23L/1/164 |
| EP | 0712883 A1 | 5/1996 | ............. C08J/9/00 |
| FR | 1542310 | 9/1968 | |
| GB | 965349 | 7/1964 | |
| GB | 1183027 | 3/1970 | ............. B29F/3/04 |
| GB | 2275051 | 8/1994 | ......... C08B/30/106 |
| IT | 000228-94 | 2/1994 | |
| IT | MI 94 A 000228 | * 2/1994 | |
| NL | 270677 | 7/1964 | |
| WO | 90/14935 | 12/1990 | ............. B27N/3/28 |
| WO | 90/15706 | 12/1990 | ........... B29C/47/00 |
| WO | 92/08759 | 5/1992 | ............. C08L/3/02 |
| WO | 93/05668 | 4/1993 | |
| WO | WO93/08014 | 4/1993 | |
| WO | 93/08014 | 4/1993 | ........... B29C/67/22 |
| WO | 93/14149 | 7/1993 | ............. C08J/3/02 |
| WO | 94/13737 | 6/1994 | ............. C08L/3/02 |
| WO | 96/07539 | 3/1996 | ............. B32B/9/06 |
| WO | 96/07693 | 3/1996 | ............. C08J/9/232 |

* cited by examiner

RESILIENT BIODEGRADABLE PACKAGING MATERIALS

CROSS-REFERENCE TO RELATED APPLICATIONS

This application is a continuation of U.S. patent application Ser. No. 08/784,859, filed Jan. 15, 1997, ABN which is a continuation-in-part of U.S. patent application Ser. No. 08/421,720, filed Apr. 14, 1995, now U.S. Pat. No. 5,766,529 both of which are incorporated in their entirety by reference herein.

FIELD OF THE INVENTION

This invention relates generally to expanded biodegradable starch-containing products with improved flexibility, pliability or resiliency and other properties appropriate for use as packaging materials, particularly for extruded sheets, molded trays and other packaging containers. The invention includes improved methods for manufacture of expanded starch products and starch-containing extruder feed compositions.

BACKGROUND OF THE INVENTION

Biodegradable materials are presently in high demand for applications in packaging materials. Commonly used polystyrene ("Styrofoam" (Trademark)), polypropylene, polyethylene, and other non-biodegradable plastic-containing packaging materials are considered detrimental to the environment. The use of such non-biodegradable materials will decrease as government restrictions discourage their use in packaging applications. Biodegradable materials that are flexible, pliable and non-brittle are needed in a variety of packaging applications, particularly for the manufacture of shaped biodegradable containers for food packaging.

For such applications, the biodegradable material must have mechanical properties that allow it to be formed into and hold the desired container shape, being resistant to collapse, tearing or breaking. In addition, biodegradable materials with resiliency, compressibility and bulk density comparable to "Styrofoam" (Trademark) "peanuts" are needed in loose-fill packaging applications. Further, biodegradable sheet materials having properties comparable to polypropylene and polyethylene materials are needed, for example, in laminating packaging materials.

Starch is an abundant, inexpensive biodegradable polymer. A variety of biodegradable starch-based materials have been proposed for use in packaging applications. Conventional extrusion of starch produces expanded products that are brittle, sensitive to water and unsuitable for preparation of packaging materials. Attempts to prepare starch-based products with flexibility, pliability or resiliency and other mechanical properties acceptable for various biodegradable packaging applications have generally focused on chemical or physico-chemical modification of starch, the use of expensive high amylose starch or mixing starch with synthetic polymers to achieve the desired properties while retaining biodegradability. A number of references relate to extrusion, and injection molding of starch-containing compositions.

U.S. Pat. Nos. 4,133,784, 4,337,181, 4,454,268, 5,322,866, 5,362,778, and 5,384,170 relate to starch-based films that are made by extrusion of destructurized or gelatinized starch combined with synthetic polymeric materials. U.S. Pat. No. 5,322,866 specifically concerns a method of manufacture of biodegradable starch-containing blown films that includes a step of extrusion of a mixture of raw unprocessed starch, copolymers including polyvinyl alcohol, a nucleating agent and a plasticizer. The process is said to avoid the need for pre-processing of the starch. U.S. Pat. No. 5,409,973 reports biodegradable compositions made by extrusion from destructurized starch and an ethylene-vinyl acetate copolymer.

U.S. Pat. No. 5,087,650 relates to injection-molding of mixtures of graft polymers and starch to produce partially biodegradable products with acceptable elasticity and water stability. U.S. Pat. No. 5,258,430 relates to the production of biodegradable articles from destructurized starch and chemically-modified polymers, including chemically-modified polyvinyl alcohol. The articles made are said to have improved biodegradability, but to retain the mechanical properties of articles made from the polymer alone. U.S. Pat. No. 5,292,782 relates to extruded or molded biodegradable articles prepared from mixtures of starch, a thermoplastic polymer and certain plasticizers. U.S. Pat. No. 5,403,875 relates to blends of starch with acrylic polymers which are melt-processed into thermoplastic articles. U.S. Pat. No. 5,393,804 relates to biodegradable compositions made from starch melts containing converted starch and plasticizers including polyvinyl alcohol. U.S. Pat. No. 5,095,054 concerns methods of manufacturing shaped articles from a mixture of destructurized starch and a polymer.

U.S. Pat. No. 4,125,495 relates to a process for manufacture of meat trays from biodegradable starch compositions. Starch granules are chemically modified, for example with a silicone reagent, blended with polymer or copolymer and shaped to form a biodegradable shallow tray.

U.S. Pat. No. 4,673,438 relates to extrusion and injection molding of starch for the manufacture of capsules. U.S. Pat. No. 5,427,614 also relates to a method of injection molding in which a non-modified starch is combined with a lubricant, texturizing agent and a melt-flow accelerator.

U.S. Pat. Nos. 4,863,655, 5,035,930 and 5,043,196 report expanded starch materials in which the starch has at least 45% by weight amylose (high amylose materials). Expanded high amylose starch compositions have also been modified by reaction with oxiranes (e.g. ethylene oxide) and include the commercially available "ECO-FOAM" (Trademark) in which the starch is modified by reaction with propylene oxide. Expanded packaging materials made from high amylose starch are too expensive for practical commercial use. U.S. Pat. No. 5,314,754 of Knight (May 24, 1994) reports the production of shaped articles from high amylose starch.

EP published application EP 712883 (published May 22, 1996) relates to biodegradable, structured shaped products with good flexibility made by extruding starch having defined large particle size (e.g., 400 to 1500 microns). The application, however, only exemplifies the use of high amylose starch and chemically-modified high amylose starch.

U.S. Pat. No. 5,512,090 refers to an extrusion process for manufacture of resilient, low density biodegradable packaging materials, including loose-fill materials, by extrusion of starch mixtures comprising polyvinyl alcohol (PVA) and other ingredients. The patent refers to a minimum amount of about 5% by weight of PVA. U.S. Pat. No. 5,186,990 reports a lightweight biodegradable packaging material produced by extrusion of corn grit mixed with a binding agent (guar gum) and water. Corn grit is said to contain among other components starch (76–80%), water (12.5–14%), protein (6.5–8%) and fat (0.5–1%).

U.S. Pat. No. 5,208,267 reports biodegradable, compressible and resilient starch-based packaging fillers with high volumes and low weights. The products are formed by extrusion of a blend of non-modified starch with polyalkylene glycol or certain derivatives thereof and a bubble-nucleating agent, such as silicon dioxide. U.S. Pat. No. 5,252,271 of Hyrum (Oct. 12, 1993) reports a biodegradable closed cell light weight packaging material formed by extrusion of a modified starch. Non-modified starch is reacted in an extruder with certain mild acids in the presence of water and a carbonate compound to generate $CO_2$. Resiliency of the product is said to be 60% to 85%, with density less than 0.032 $g/cm^3$.

U.S. Pat. No. 3,137,592 relates to gelatinized starch products useful for coating applications produced by intense mechanical working of starch/plasticizer mixtures in an extruder. Related coating mixtures are reported in U.S. Pat. No. 5,032,337 to be manufactured by extrusion of mixture of starch and polyvinyl alcohol. Application of thermomechanical treatment in an extruder modifies the solubility properties of the resultant mixture which can then used as a binding agent for coating paper.

While significant progress has been made toward non-brittle, starch-based biodegradable packaging materials, there nevertheless remains a significant need for lowering production costs and improving the physical and mechanical properties of extruded starch materials.

SUMMARY OF THE INVENTION

The present invention provides methods for producing biodegradable expanded starch products with improved properties for packaging applications. These methods comprise the steps of extruding a starch-containing mixture through an expansion die, followed by compressing the extrudate, for example, by subjecting the extrudate to pressure generally perpendicular to the direction of extrusion. Compression can be applied, for example, by use of a rolling device. The extrusion can be performed using conventional methods and apparatus. Die size, die shape and/or type of compression used, e.g., roller configuration, are selected to produce a shaped, compressed or rolled extrudate. The compressed or rolled exudate is optionally subjected to further shaping, molding and/or cutting to obtain a desired final shaped article to suit the planned application.

It has been found that compressing, or compression combined with stretching of the starch-based extrudate significantly improves the flexibility, pliability, mechanical strength and dimensional stability of extruded, pressure molded packaging containers. The preferred method for compression of the extrudate is by rolling. It has also been found that compression or rolling improves the resiliency of extruded, low density expanded starch articles, such as those useful for loose fill applications. Significant decreases in the brittleness of extruded starch products are achieved by compressing, rolling, compressing and stretching or rolling and stretching of the material after extrusion. Application of the methods of this invention allows production of expanded starch packaging materials having mechanical properties suitable for packaging application using significantly lower levels of expensive polymeric plasticizers, e.g., polyols such as polyvinyl alcohol.

In the method of this invention, pressure can be applied to the emerging extrudate in a direction generally perpendicular to the direction of extrusion. Pressure is preferably applied substantially perpendicular to the direction of extrusion. The pressure applied is preferably sufficient to substantially compress the cells in the extrudate. Surprisingly, it is believed that substantially compressing, or preferably crushing, the cells of the expanded product significantly improves the flexibility, pliability or resiliency of the product and significantly reduces brittleness. The preferred method of applying pressure to the extrudate is rolling the extrudate between opposed rollers. The amount of pressure applied may be varied dependent upon the desired final properties of the material. Rolling is preferably done while the extrudate is still hot, most preferably immediately upon exit of the extrudate from the extruder die.

In another aspect, the present invention provides a method of producing improved expanded starch products comprising the steps of extruding a starch-containing mixture through an expansion die, followed by stretching the extrudate, for example, by pulling the extrudate in the direction of extrusion. Stretching can be applied, for example, by pulling the extrudate strand, substantially in the direction of extrusion, faster than the rate of extrusion. Extrusion can be performed using conventional methods and apparatus. Die size, die shape and/or stretching rate applied are adjusted to provide desired final properties in the extruded product. The stretched extrudate is optionally subjected to further shaping, molding and/or cutting to obtain a desired final shaped article to suit the planned application. Stretching of the starch-based extrudate significantly improves the final properties of shaped extruded articles, including pressure molded packaging containers.

In one embodiment of the method, the extrudate is compresses without substantial stretching. The preferred way to achieve compression without substantial stretching is to employ rollers in which roller speed is substantially matched to the rate of extrusion, so that minimal lateral pressure is applied to stretch the extrudate. In another embodiment of the method, the extrudate is stretched, for example by pulling the extrudate strand as it exits the die at rate faster than the extrusion rate. Preferred stretch rates range from about 1.1 to about 1.5.

In yet another embodiment, the extrudate is compressed and stretched. The extrudate can be stretched before, after or at the same it is being compressed. Preferably stretching is applied at the same time as compression. The preferred way to compress and stretch the extrudate is to employ rollers in which the roller speed is set faster than the rate of extrusion. In this case, the extrudate is both rolled and stretched. Roller speeds for stretching are typically set to be less than or equal to 50% faster than the extrusion rate. Preferred roller speeds for stretching are between about 10% to about 20% faster than the extrusion rate. However, the desired amount of stretching is dependent upon the desired final properties of the product as used herein, a roller speed of 10%, 20%, or 50% faster than the extrusion rate means a 1.1, 1.2 or a 1.5 stretch rate of the extrudate, respectively.

The compressed, stretched, compressed and stretched expanded starch product is biodegradable and has low brittleness and other properties making it attractive for use in packaging applications.

In one embodiment, this invention provides improved starch sheets for cushioning and packaging applications. Sheets are preferably prepared by rolling, or rolling and stretching the extrudate, using a flat roller. Rolled expanded starch sheets are generally useful in packaging and wrapping applications and in the manufacture of laminated materials for packaging applications, such as for manufacture of mailing envelopes and related containers. Single-ply, two-ply or multiple ply sheets can be formed by the method of this invention.

In another embodiment, this invention provides improved molded starch articles, particularly articles that are pressure molded from extruded compressed, rolled or rolled and stretched starch sheets. Molded articles can have various sizes and shapes including shallow and deep trays, cups, tubs, tubes and other containers. Molded articles can also be single or multiple compartment trays or containers and can also be shaped with internal or external ridges, lips, or rims. The starch extrudate is compressed, rolled, or rolled and stretched prior to pressure molding. Pressure molding can employ conventional processes and equipment.

In yet another embodiment, this invention provides improved expanded starch materials having high resiliency, suitable compressibility, low density, low dusting, and low brittleness for use in loose fill packaging applications. These improved starch materials are produced by methods described herein by extrusion, combined with a step of compressing or substantially crushing the cells in the extrudate, preferably by rolling the hot extrudate. Loose-fill can be produced in a variety of shapes by choice of suitable combinations of die and roller shapes. This invention provides a loose fill expanded starch product with resiliency higher than 50% useful for packaging applications. Loose-fill products of this invention have compressibility, flexibility properties comparable to "Styrofoam" loose fill.

The methods of this invention can be employed essentially with any starch composition suitable for extrusion. In particular and preferably, the method can be used with starch compositions in which the major ingredient is raw non-modified starch. The method of this invention allows the use of significantly lower levels of plasticizers in the starch extruder feed than previously known to achieve desired mechanical properties in the final expanded or molded starch products.

The invention also provides extruder feed mixtures containing raw, non-modified starch for production of expanded starch products which contain lower levels of plasticizers, particularly lower levels of polymeric plasticizers, such as PVA and related polyols. Extruder feed mixtures of this invention may comprise non-modified starch. To achieve lower production costs, extruder feed mixtures preferably contain less than 5% (by weight) PVA or related polyhydric plasticizer. More preferred extruder feed mixtures contain less than or equal to about 2.5% PVA or related polyhydric plasticizer. Most preferred extruder feed mixtures contain no PVA or related polyhydric plasticizer.

It has been found that lighter weight expanded starch articles and expanded starch pressure molded articles with good mechanical strength and dimensional stability can be produced by the process of this invention from extruder feed mixtures that contain talc.

In another aspect, the invention provides a new extrusion device in which a conventional extruder is combined with a pressure device which can apply pressure to an extrudate emerging from an extruder die substantially perpendicular to the direction of extrusion. The pressure applied being sufficient to substantially compress or preferably to crush the cells in the hot extrudate. The amount of pressure applied and the length of application time of pressure depends upon the desired final properties of the product.

Additional aspects and features of the invention will become apparent in the following detailed description of the invention.

DETAILED DESCRIPTION OF THE INVENTION

Figure 1:
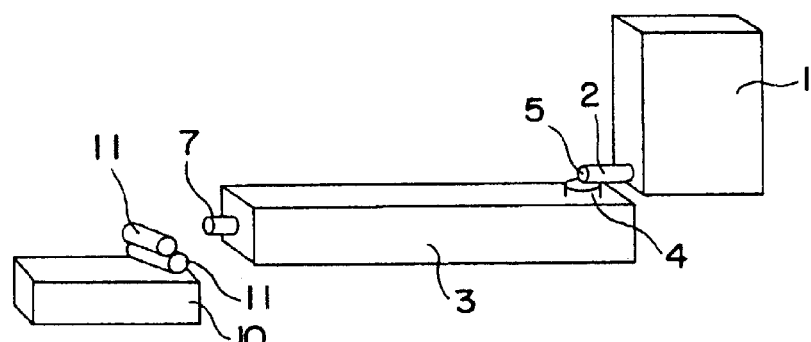
FIG. 1 is a schematic drawing of an extrusion/rolling or extrusion/rolling and stretching device useful in practicing the methods of this invention.

The process of making shaped extruded starch articles of this invention is described by reference to the schematic manufacturing extrusion apparatus of FIG. 1. Raw non-modified starch is mixed with desired additives, for example in an attached feeder (1), through a feed tube (2) and introduced into the mixing compartment of an extruder (3), preferably a twin screw extruder, for example through an inlet (4). The feed tube (2) contains a flow smoother (5). The mixture is further mixed and blended, subjected to shearing, increasing temperature and pressure in the extruder to form a mass which is forced through an expanding die (7). The mass is preferably a homogeneous hot melt. Preferably, the mass is plasticized.

Figure 2:
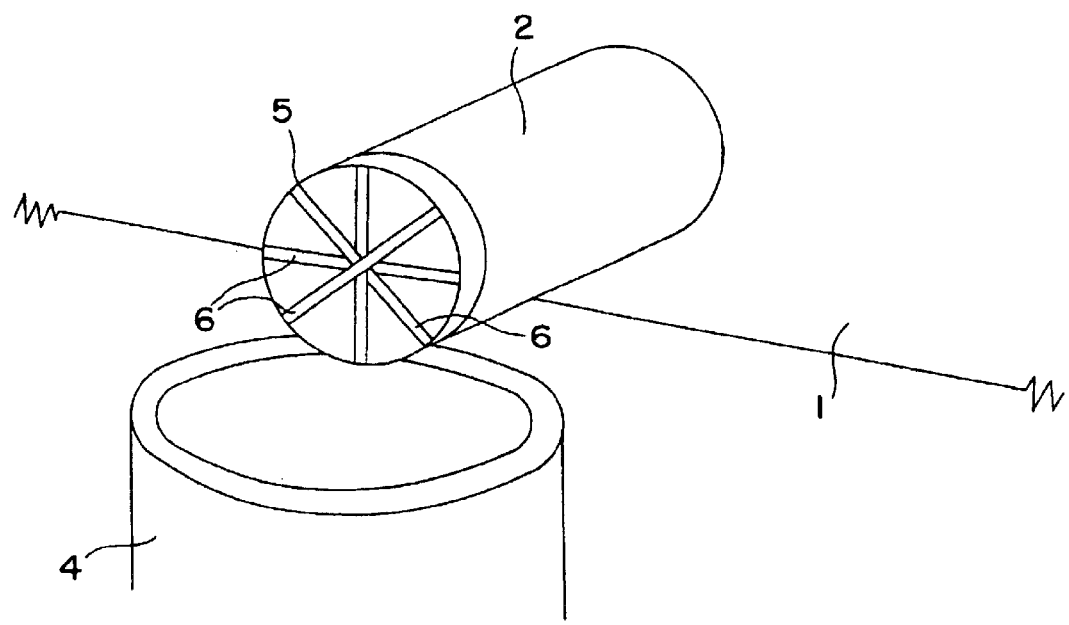
FIG. 2 is a schematic drawing of a flow smoother employed in the device of FIG. 1.

As shown in more detail in FIG. 2, the feed tube (2) of the feeder (1) contains a flow smoother (5). This device functions to ensure consistent feed to the extruder to minimize or prevent surging of feed into the extruder. The device comprises arms or spokes (6) that traverse the mouth of the feed tube. Most simply, the device can comprise a set of crossed wires secured at and across the mouth of the feed tube. Other configurations of the flow smoother will be readily apparent to those of ordinary skill in the art. It has been found that the quality of the extruded material, particularly the quality of extruded sheets is significantly improved, if a flow smoother is employed.

The shape of the die determines the shape of the extruded strand and die shape is typically chosen to prepare a desired shape of expanded product. The mixture is typically extruded out of the die at a pressure of about 700 to 2000 psi and the extrudate is at a temperature of about 120° C. to about 200° C. at extrusion. The extruder is typically heated and can have several zones along its length in which temperature is separately adjustable.

For preparation of pressure molded expanded starch articles, including trays, the extrudate is preferably formed as a tube by use of an annular or tubular extruder die. The thickness of the extruded tube is preferably between about 0.1 and 0.05 inches and more preferably between about 0.1 to 0.03 inches. The extruder tube produced is preferably immediately compressed, e.g., by rolling or rolling and stretching, between a pair of flat opposed rollers. Rolling of the tube results in a two-ply sheet. Multi-ply sheets can be formed by overlaying two or more extruded tubes followed by compression or rolling. Alternatively, the extruded tube can be split to form a strip which is then compressed or rolled to give a single-ply sheet. The compressed or rolled sheet is optionally cut, and further shaped. For example, a rolled sheet can be passed into a pressure mold where it is pressed into the shape of the desired product. The resulting shaped article can be finished by smoothing or trimming rough edges or by the application of desired coatings. For example, sealants, lubricants, water-resistant or water-repellant coatings can be applied to achieve a desired surface appearance or quality or to minimize loss of water from (or absorption of excess water by) the shaped article. Dyes, fragrances, preservatives, bactericides may also be included or added into the extrudate used to form a shaped article.

The term sheet is used herein to refer to a generally flat, relatively thin slab of extrudate which is preferably sufficiently thick to allow formation of an expanded starch article which retains dimensional stability. A sheet as used herein is not intended to include films which do not retain dimensional stability. The method of this invention can be employed to make films, however, sheets are the preferred precursor to shaped extruded molded articles. Preferred sheets for preparation of extruded starch articles have thickness that is greater than about 1/50th of an inch and more preferably greater than about 1/16th of an inch. In general, however, the thickness of the sheet, which is determined in part by choice of die and type of compression or stretching applied, e.g., roller gap, is selected to achieve desired final dimensions and properties in the shaped extruded starch article.

It has been found to be beneficial to the quality of the final molded product to pinch the ends of the extruded tube prior to compression or rolling. It is believed that pinching the tube end to form a pillow entraps steam that is beneficial during the compression/rolling process to better maintain the temperature of extrudate on compression/rolling or to provide a humid environment for compression/rolling. Provision of a steam box at the end of the extruder to enclose the extrudate as it is passed from the extruder die for compression, e.g., as it is passed to the roller, will provide similar benefit to the quality of the compressed or rolled material. It has been found that the length of time between rolling and molding has a significant effect on the quality of the resultant molded article. Preferably the compressed or rolled sheet is immediately passed to the mold for pressure molding. It is believed that an important factor in this step is the temperature of the mold in relation to the temperature of the sheet. The sheet is preferably pressure molded while still hot. Alternatively, the mold itself can be heated to insure consistent quality of product.

Water can be added to the extrusion system during the residence of the base starch mixture in the extruder to adjust the consistency of the starch mixture during extrusion and/or to adjust the extent of expansion of the product. Lubricant levels in the extrudate can also be adjusted to improve flow through the extruder. Glycerin levels in the extruder can also be adjusted to improve flow and/or vary properties of the expanded product. There is no requirement to remove water from the base mixture in the extruder prior to extrusion. Specifically, there is no requirement to apply subatmospheric pressure to the extrudate or extruded strand to remove water.

Continuing to refer to FIG. 1, the extrudate strand which exits the die (7) is preferably fed through a rolling device (10) having two or more rollers (11) positioned with respect to each other to apply pressure to the strand substantially perpendicular to the direction of extrusion. Multiple set of rollers can be employed, positioned sequentially along the direction of extrusion to sequentially apply pressure to the extrudate. Pressure from each roller employed is preferably applied substantially perpendicular to the direction of extrusion. Each set of rollers can be set to apply the same or different amounts of pressure to the extrudate. The rollers in a given set of rollers can form an opening corresponding to the shape of the desired product. For formation of expanded starch sheets, including those which are subsequently optionally pressure molded, one or more pairs of opposed flat rollers can be employed. Preferably, the rollers exert sufficient pressure upon the strand to substantially compress the cells, or more preferably crush the cells, in the strand. The rollers can also be used to finalize shaping of the expanded product.

The process step of applying pressure to the extrudate strand, preferably by rolling, is an important improvement in the manufacturing process of this invention which results in significantly decreased brittleness of extruded starch products. The application of pressure as described herein also reduces dustiness and chipping of extruded products and increases bulk density. The roller pressure required to obtain improved properties depends on the shape of the extrudate, cell size and bulk density of the extrudate which in turn depends on the composition of the extrudate including the type of starch and water content. The required roller pressure needed to achieve the desired final properties is readily determined for a particular starch composition and product shape empirically without the expense of undue experimentation. In general, roller pressure for making sheet products will be higher than in making shaped loose fill.

Roller speed can be adjusted to substantially match the extrusion rate. If this is done, minimal stretching of extrudate occurs. Alternatively, the roller speed can be adjusted to be somewhat faster than the rate of extrusion. In this case, the extrudate is both rolled and stretched. compression accompanied by stretching, as applied when an extrudate is rolled and stretched, has surprisingly been found to confer improved properties on starch articles molded using the compressed and stretched extrudate. Roller speeds up to about 50% faster than the extrusion speed can be applied to achieve stretching with compression. Preferred roller speeds for stretching and compression are between about 10% to about 20% faster than the rate of extrusion.

The substantially compressed or preferably crushed extrudate is cut into desired lengths by a cutting device, for example with a rotating knife positioned after the rollers. For preparation of loose fill, the resultant cut strands are preferably cured under controlled temperature and humidity conditions. Loose fill curing is preferably done between 18°–30° C., and more preferably at about 21° C., at humidity ranging from about 40%- about 80%, and more preferably at about 50% humidity, for about 1 or 2 days.

The manufacture of expanded starch loose fill and expanded starch sheets is typically done in a continuous mode by continuous feed into the extruder, extrusion, compression/rolling and cutting.

A conventional twin screw extruder having feed screws, single lead screws, shear paddles (preferably 3 or more, 3–10 being typical) and mixing paddles (typically 1–5) can be employed in this process. An expanding type screw configuration can be used in the twin-screw extruder. Typical residence time of the base mixture (i.e. the starch with any additives) in the extruder is from about 9 to about 20 seconds and extrusion occurs at a rate from about 100 to about 200 lb/h per die insert.

The size and configuration of the die opening determines the cross-sectional shape of the extrudate strand. A variety of shapes and sizes of final products can be made. The starch can also be extruded as an expanded sheet to make sheets of cushioning material or for further shaping through pressure molding. Typically, product sheets having a thickness of about 1/10 to about 1/4 inch can be made by the extrusion/compression method. Extruded starch products for loose fill packaging material, for example, can have several cross-sectional shapes, including among others, capital omicron, FIG. 8, short rods, S-shaped, C-shaped, oval, and an omega. The product shape does not significantly effect resiliency of loose fill packing material. Bulk density of loose fill can, however, be dependent upon shape.

A preferred rolling device applies pressure to the extrudate strand substantially perpendicular to the direction of extrusion. The hot extrudate strand can simply be passed through opposed flat rollers (which may distort the shape imposed by the die). Generally, it is preferred that the roller or rollers apply pressure symmetrically to the hot extrudate conforming to the desired product shape, e.g., a rolled sheet is preferably employed for pressure molding of trays and like containers. Rollers can be made of stainless steel, teflon or a related materials that are inert to the extrudate. Rollers are preferably positioned with respect to the extruder die such that the hot extrudate strand can be directly fed into the rollers while the extrudate strand is still hot.

A compression or rolling step has not previously been applied to the production of expanded starch products. Preferred rollers are spring-loaded and the pressure applied is adjustable. While rolling is the preferred method for applying pressure to the extruded strand to achieve desired properties in expanded starch articles, those of ordinary skill in the art will appreciate that other methods may be applied to achieve the desired result. It will also be appreciated that a variety of methods are available to stretch the extrudate. In particular, a variety of methods are available for stretching the extrudate before, during or after compression.

Preferably, rollers are positioned sufficiently close to the extruder die so that the extrudate remains hot during rolling. For ease of illustration, the roller device of FIG. 1 shows one set of rollers. Two or more sets of rollers in sequence can be employed in the processing method of this invention. The use of more than one set of rollers may improve process efficiency. However, care should be taken to keep the extrudate hot during the process of rolling. Rollers may be heated. For production of starch sheets, in particular, the use of two or more rollers may be preferably to achieve desired final properties.

The shape of loose fill packaging material affects the interlocking capability of the material. Loose fill shaped so that there is some interlocking between pieces is less readily displaced by jostling and better protects packaged items from impact damage. Loose fill shapes preferred for interlocking capability are those with protrusions or indentations which allow pieces to interlock.

The preferred extruder feed compositions of this invention contain raw non-modified starch as a major ingredient (about 70% to about 97% by weight). Minor amounts of additives, including lubricant, plasticizer, humectant, nucleating agent and another blowing agent (in addition to water) wherein the additives preferably comprise up to a maximum of 30% by weight of the total weight of the extrudates, may be added. One of the preferred extrudates contains a minimum amount of plasticizers, including polyvinyl alcohol or ethylene vinyl alcohol (or other polyols) to obtain desired properties when processed by the improved extrusion/compression method described herein. In particular, preferred extruder feed contains less than about 5% by weight of polyvinyl alcohol or ethylene vinyl alcohol. More preferred extruder feeds contain less than or equal to about 2.5% by weight or contain less than or equal to about 1% by weight of polyvinyl alcohol or ethylene vinyl alcohol.

Water is typically added to the extruder feed during its passage through the extruder, most typically at the inlet portion of the extruded. Added water may generally represent about 30% or less of the starch composition in the extruder. Additional variable amounts of water are present in the starch itself. The amount of water added in a given extrusion will depend on the extrusion conditions, the initial water content of the starch used and the desired product. Generally, the amount of water in the extrudate is adjusted to maximize expansion of the extruded product, while avoiding a soft or runny extrudate. Water can be premixed with or added separately from other base starch mixture ingredients. For example, water can be added, and its addition adjusted and controlled, through inlet ports into the extruder. The amount of water that must be added depends on the moisture content of the raw starch. The total water content of the base starch mixture prior to extrusion is typically between about 6% and about 18%.

It has been found that pressure molded articles having suitable properties for packaging applications, such as containers and trays, can be prepared using extruder feed compositions which contain no polymeric or polyol plasticizer, e.g., no PVA or EVA.

In preferred embodiments, this invention uses raw, non-modified, non-derivatized starch which is essentially starch as it occurs in nature other than having been physically separated from other plant components. The starch is typically a powder (fine or coarse) or granular. Cornstarch is the preferred starch in this invention, however any type of non-modified starch from wheat, rice, potatoes, tapioca, or the like or mixtures of starches can also be used. Mixtures of starches from different plant sources can be employed. In addition, other natural or synthetic materials that comprise starch as a major component, for example rice flour, can also be used as the source of starch for the process of this invention.

The invention does not require the use of high amylose starch to achieve desired high flexibility or resiliency. The invention does not require the use of derivatized starch, such as starch which has been chemically reacted at the hydroxy groups (e.g. esterified, etherified or phosphorylated). The invention does not require preconditioning of starch by treatment with heat or pressure, gelatinization or destructurization of starch before addition to the extruder. Nevertheless, starch compositions comprising high amylose starch, modified or derivatized starch or starch compositions that are preconditioned, gelatinized or destructurized can be processed by the improved extrusion/compression or and compression and stretching process of this invention to provide extruded materials with improved properties for use as packaging materials. Mixtures of modified or otherwise treated starch and raw, non-modified starch can be employed in the methods of this invention. Preferred starch for use in this invention is predominantly non-modified starch, i.e. starch containing 50% or more by weight non-modified starch.

Flexible, pliable or resilient expanded starch products of this invention can be prepared with lower levels of plasticizers, particularly polyvinyl alcohol, ethylene vinyl alcohol and related polyol materials than has been taught in the prior art.

The pre-mixed base starch mixture, the extruder feed (including any added water, lubricant, glycerin or other ingredient) can be directly introduced into the extruder or the individual components can be added in any order into the extruder for mixing therein. In a preferred method of addition of the components, water, lubricant and glycerin are added to the remaining ingredients in the extruder through independently adjustable inlets into the extruder. Extruder feed mixtures of this invention predominantly comprise starch with minor amounts of nucleating agent, such as corn meal or talc.

The preferred extruder feed mixture of this invention predominantly comprise starch with minor amounts of humectants, plasticizers, lubricants, nucleating agents and optional blowing agents and agents which function to reduce cell size. Glycerin, related polyols including pentaerythritol, and vegetable oil among others may function in starch extrusion as humectants and/or lubricants to improve the flow properties of the mixture and provide smooth surfaces for extrusion. Polyvinyl alcohol, ethylene vinyl alcohol and related polymeric polyols may function as plasticizers. Glycerin may also function as a plasticizer. Talc, protein as grain meal, in egg albumin or blood meal or other protein sources, and materials which generate $CO_2$-like "Hydrocerol" (Trademark, Boehringer Ingelheim) may function as nucleating agents.

Encapsulated sodium bicarbonate and citric acid mixtures for example, Myvaplex, which generates $CO_2$ and sodium citrate, for example, "Hydrocerol" (CF and BIH forms, for example, available from Boehringer Ingelheim) can act as a nucleating agent. Different forms of encapsulated material are available in which the encapsulated ingredients are released at different temperatures. Those of ordinary skill in the art can readily choose the appropriate form for a given application. In general, the form which releases at the lowest temperature compatible with the application is used. Glycerol monostearate and other glycerol monoesters of fatty acids may function to aid in formation of uniform small cells in the extruded material. Superheated water in the extrudate may act as a blowing agent. The extruder feed of this invention can also include additional minor amounts of blowing agents, including among others carbonate salts including sodium, potassium and ammonium salts. Any vegetable oils or polyols employed in the base mixture are preferably pumpable. In general, the extruder feed mixture of this invention may contain combinations of one or more humectants, plasticizers, lubricants, nucleating agents and/or blowing agents. The maximum amount of these additives is preferably about 30% by weight of the total weight of the extruder feed mixture (including added water). The extruder feed mixture preferably contains a minimum of these additives needed to attain desired properties of extruded product. The base mixture contains a minimum amount of plasticizer to decrease its cost. The compression/rolling step of this invention allows the use of much lower amounts of plasticizers than are required in prior art processes to obtain flexible, non-brittle expanded starch products. Preferred extruder feed contain less than about 5% plasticizer. Polymeric vinyl alcohols are often employed in starch extrusion processes as plasticizers. The preferred extruder feed mixtures of this invention contain less than about 5% by weight of polyvinyl alcohol, polyethylene alcohol or related polymeric vinyl alcohols (or mixtures thereof). Preferred extruder feed mixtures of this invention include those in which the amount of polymeric vinyl alcohol is less than about 5% by weight and, specifically, those having less than about 2.5% by weight as well as those having less than about 1% by weight of polymeric vinyl alcohol. PVA having different average molecular weights, is available. Airol 325 and Airol 540, both available from Air Products were found suitable in extruder feeds of this invention. Mixtures of this invention may also contain relatively low levels of glycerin or other humectants. Mixtures of this invention include those in which glycerin content is less than about 1.5% by weight and those in which glycerin content is less than about 0.5% by weight. Mixtures of this invention also include those in which talc content is between about 1% by weight to about 10% by weight and those in which talc content is between about 1% by weight and about 5% by weight.

Glycerol monostearate (for example, "Myvaplex" (Trademark, Eastman Kodak) can be included in the extruder feed to provide improved uniformity of cell size in the expanded starch. Glycerol monostearate is preferably included in the extruder feed in an amount ranging from about 0.1% to about 0.5% by weight. More preferably, it is present in an amount from about 0.15% to about 0.25% by weight.

For example, extruder feed mixture of this invention can contain the following ingredients expressed in weight percent: starch (about 70% to about 97%), preferably predominantly raw, unmodified starch; added water (up to about 30%); vegetable oil (up to about 6%); glycerin (up to about 3%); polyvinyl alcohol or other plasticizer (up to about 25%, preferred maximum of less than about 5%); proteinaceous grain meal (up to about 20%); glycerol monostearate (up to about 0.5%); additional blowing agent (up to about 0.8%); and talc (up to about 10%) with the provision that the mixture must contain a nucleating agent. Additional water and/or lubricant can be added during extrusion.

Other examples of extruder feed mixtures suitable for use in this invention include the following where composition is expressed in weight percent:

Composition A comprising:
  Starch about 60% to about 97%;
  Proteinaceous grain meal 0% to about 10%, if present, preferably about 4% to about 10%;
  Polyvinyl alcohol 0% to about 27%, if present, preferably less than about 5%;
  Talc 0% to about 20%, if present, preferably about 0.1% to about 10%, more preferably about 0.1% to about 1.5%;
  "Myvaplex" (Glycerol monostearate) 0% to about 0.5%, if present, preferably about 0.1% to about 0.3%, more preferably about and 0.2%;
  "Hydrocerol" 0% to about 2%, if present, preferably about 0.2% to about 0.5%;
  with the proviso that a nucleating agent must be present;
Composition B comprising:
  Starch about 70% to about 97%;
  Proteinaceous grain meal preferably about 4% to about 10%;
  Polyvinyl alcohol 0% or if present, preferably less than about 5%, more preferably less than about 2.5% or less than about 1%;
  Talc 0% or if present preferably about 0.1% to about 1.5%;
  "Myvaplex" about 0.2%; and
  "Hydrocerol" 0% or is present preferably about 0.2% to about 0.5%;
Composition C comprising:
  Starch about 70% to about 97%;
  Proteinaceous grain meal 0% or if present preferably about 4% to about 10%;
  Polyvinyl alcohol preferably less than about 5%, more preferably less than about 2.5% or less than about 1%;
  Talc preferably about 0.1% to about 1.5%;
  "Myvaplex" about 0.2%; and
  "Hydrocerol" preferably about 0.2% to about 0.5%
Composition D comprising:
  Starch about 70% to about 97%;
  Proteinaceous grain meal 0% or if present preferably about 4% to about 10%;
  Polyvinyl alcohol preferably less than about 5%, more preferably less than about 2.5% or less than about 1%;

Talc preferably about 0.1% to about 10%;
"Myvaplex" about 0.2%; and
"Hydrocerol" 0%, or if present, preferably about 0.2% to about 0.5%;

Composition E comprising:
Starch about 70% to about 97%;
Polyvinyl alcohol preferably less than about 5%, more preferably less than about 2.5% or less than about 1%;
Talc preferably about 0.1% to about 10%; more preferably about 1% to about 10%;
"Myvaplex" about 0.2%; and
"Hydrocerol" 0%, or if present, preferably about 0.2% to about 0.5%;

Composition F comprising:
Starch about 70% to about 97%;
Polyvinyl alcohol preferably less than about 5%, more preferably less than about 2.5% or less than about 1%;
Talc preferably about 0.1% to about 10%; more preferably about 1% to about 10%; and
"Myvaplex" about 0.2%;

Composition G comprising:
Starch about 70% to about 97%;
Talc preferably about 1% to about 10%, more preferably about 5% to about 6%; and
"Myvaplex" about 0.2%; and
"Hydrocerol" preferably about 0.2% to about 0.5%;

Composition H comprising:
Starch about 70% to about 97%;
Polyvinyl alcohol preferably less than about 5%, more preferably less than about 2.5% or less than about 1%;
"Myvaplex" about 0.2%; and
"Hydrocerol" preferably about 0.2% to about 0.5%;

Composition I comprising:
Starch about 60% to about 97%;
Proteinaceous grain meal preferably about 4% to about 10%;
Polyvinyl alcohol up to about 27%;
"Myvaplex" about 0.2%;
Oil, e.g., vegetable oil, 0% to about 1.5%;
Glycerine 0% to about 1.5%; and
"Hydrocerol" preferably about 0.2% to about 1%;

The extruder feed composition of this invention can optionally contain coloring agents, fragrances, bactericides and mould-inhibiting agents. The extruder feed may optionally include various sources of fiber, e.g., soy fiber. Fiber content can preferably range up to about 10% by weight of the extruder feed, but can be varied to adjust stiffness of extruded sheets and molded articles.

It has been found that starch materials that have been compressed into sheets and pressure molded may be recycled back into the extrusion process by grinding the materials very finely, and combining them with additional feed composition. For example, it has been found that the use of an extruder feed in which up to about 20% by weight of the starch is ground recycled extruded starch results in no significant detriment to properties of the final extruded, shaped product. Depending upon the desired final properties of the product, a higher or lower percentage of recycled material may be included in the extruder feed for processing.

Resiliency (also called bulk resiliency) is the capability of a material to recover its size and shape, i.e. to recover its original volume, after deformation by a compressive force. Bulk resiliency of a material is assessed as percent recovery of volume by measuring the original volume (as height of a given amount of material in a container) and the volume after about a 30-second recovery from the application of a compressive force. The loose fill products made as described herein will generally have resiliency of about 50% or more. Preferred loose fill products will have resiliency over about 60%, and more preferred loose fill products will have resiliency of about 75% or more. Most preferred loose fill product will have resiliency between about 85% to about 95%. In the present invention, high resiliency is substantially imparted to shaped expanded products by the physical processing step of compression, rolling, or preferably rolling with stretching of the hot extruded product. The minor amounts of humectants and plasticizers that are included in the base starch mixture do not in themselves account for the significant improvements in resiliency.

Packaging materials can also be compared and assessed based on their bulk density (weight/unit volume) and bulk compressibility (i.e., the maximum force needed to compress the sample to a preselected % of its original volume, typically to ⅔ of its original volume). Flexibility, the capability to bend without breaking, can be assessed qualitatively by applying hand pressure to the final extruded and molded products squeezing to assess how much force can be applied before the extruded product breaks.

Compressed or rolled extrudates of this invention may have a bulk density less than about 2.0 lbs/ft$^3$, but greater than 0.25 lbs/ft$^3$. The typical bulk density for corn starch products of this invention is about 0.5 to 0.8 lbs/ft$^3$. The material as extruded is typically much lighter than the final product since the compressing or rolling increases bulk density. Expanded starch products have moisture content generally lower than the extruder feed material. Typically, the compressed/rolled expanded products contain from about 5% to about 9% by weight moisture and more typically from about 6% to about 7% by weight moisture.

The mechanical properties of pressure molded and other expanded starch article made by the methods of this invention can be evaluated, for example, by preparation of tensile and Izod bars according to ASTM test methods, D638-84 and D256-84.

The extruded expanded starch products of this invention are useful in applications of shaped articles for packaging materials. In addition to loose fill packaging material, starch sheets for wrapping or other applications can be made by the extrusion/rolling method of this invention. In particular, starch sheets produced by methods herein can be combined with paper and other biodegradable materials to make biodegradable laminated materials, such as mailing envelopes. Further, articles having a variety of shapes including trays and other containers can be produced by the methods herein combined with conventional methods of molding, particularly pressure molding, of expanded starch.

The following examples are illustrative of this invention.

EXAMPLES

Example 1

Preparation of Pressure Molded Expanded Starch Products

Extruded starch sheets useful for pressure molding of trays and other shaped articles with low brittleness, suitable flexibility and useful dimensional stability were prepared using the extrusion compression method of this invention, exemplified by use of rollers to apply compression to the hot extrudate. Extruder feed compositions useful in this method include Compositions 1-I detailed above.

The components of the feed mixture were mixed prior to their introduction into the extruder. Water was added independently to the extruder. The extruder employed is a Wenger Model TX52 Twin-Screw Extruder (Wenger Manufacturing, Inc. Sabetha, Kans.) which was adapted with feed screws, single lead screw, 5 shear paddles, and 10 mixing paddles. The extruder barrel has three temperature zones. The mixture is plasticized in the extruder. In general, extruder conditions were set, as is known in the art, to provide smooth flow of extrudate. More details provided below.

Screw Configurations

Standard (#1), high intensity (#2) or medium intensity (#3) screw configurations were suitable in extrusions.

Experimental conditions for the extrusion are:

Screw configuration (#1) has the following characteristics:

| | | |
|---|---|---|
| 4 ea | 1.5 D | ¾ Pitch |
| 10 ea | Bilobal shear @ 45 deg | |
| 4 ea | 1.5 D | ¾ Pitch |
| 5 ea | Bilobal shear @ 45 deg | |
| 1 ea | 376 cone screws | |

Screw configuration (#2) has the following characteristics:

| | | |
|---|---|---|
| 4 ea | 1.5 D | ¾ Pitch |
| 10 ea | Bilobal shear @ 45 deg | |
| 2 ea | 1.5 D | ¾ Pitch |
| 1 ea | 1.5 D | ½ Pitch (cut flight) |
| 1 set | Circular shear locks, 6.5 mm thick (36/52 OD) | |
| 1 set | Circular shear locks, 6.5 mm thick (42/47 OD) | |
| 8 ea | Bilobal shear @ 45 deg | |
| 1 set | Circular shear locks, 13 mm thick (36/52 OD) | |
| 1 ea | 387 cone screws | |

Screw configuration (#3) has the following characteristics:

| | | |
|---|---|---|
| 4 ea | 1.5 D | ¾ Pitch |
| 10 ea | Bilobal shear @ 45 deg | |
| 2 ea | Bilobal shear (thin) | |
| 3 ea | 1.5 D | ¾ Pitch |
| 1 set | Circular shear locks, 6.5 mm thick (42/47 OD) | |
| 8 ea | Bilobal shear @ 45 deg | |
| 1 set | Circular shear locks, 13 mm thick (36/52 OD) | |
| 1 ea | 387 cone screws | |

Run #1

The extruder feed (in weight percent) used was: raw, non-modified corn starch 92.1%; PVA (Airvol 540) (Air Products) 2.4%); Talc 5.1%; "Myvaplex" 0.2%; and Hydrocerol BIH 0.3%.

Experimental Conditions for the Extrusion are:

Screw configuration #1, Screw RPM 474 Tube Die (Assembly Dwg 2979025A (BEI) die with adjustable outside die body, die body #2979025A, Mandrel #2979022A. Roller gap 0.203 mm. Roller speed 28 RPM (corresponds approximately to feed rate to extruder (i.e., extrusion rate). Feed rate 63 lb/hr.

| Temperatures | Z4 | 180° |
|---|---|---|
| | Z3 | 100° |
| | Z2 | 70° |
| | Z1 | 120° |

Water addition 0.21 lbs/min

Specific Mechanical Energy 0.099

The roller speed was set to correspond approximately to the feed rate so that sheets were rolled, but not stretched. Rolling improved sheet quality and assured more uniform moisture content throughout sheet. Increased flexibility from rolling was apparent. Good quality trays (flexible with dimensional stability) were produced in this run.

Run 2

The extruder feed (in weight percent) used was: raw, non-modified corn starch 94.3%; talc 5.2%; "Myvaplex" 0.2%; and Hydrocerol BIH 0.3%; a feed that contains no PVA. The extruder conditions were:

Screw configuration #1, Screw RPM 500. Same die as in Run 1. Roller gap 0.203 mm. Roller speed 17 RPM. Feed rate 63 lb/hr.

| Temperatures | Z4 | 180° |
|---|---|---|
| | Z3 | 100° |
| | Z2 | 70° |
| | Z1 | 136° |

Water addition 0.25 lbs/min

Specific Mechanical Energy 0.087

Excellent Quality Trays were Made Using this Method

Run 3

This run employed the same feed as in Run 1 and was intended to evaluate the use of a higher feed rate and a high intensity screw. The trays made were excellent quality and no significant difference was observed for variation of parameters. Extruder conditions:

Screw configuration #2, Screw RPM 480. Same die as in Run 1. Roller gap 0.203 mm. Roller speed 17 RPM (sheet stretched and rolled. Feed rate 72.8 lb/hr.

| Temperatures | Z4 | 180° |
|---|---|---|
| | Z3 | 100° |
| | Z2 | 70° |
| | Z1 | 153° |

Water addition 0.32 lbs/min

Specific Mechanical Energy 0.11

Run 4

This run employed recycled extruded sheet (about 10% by weight of the total extrudate). The extruder feed (in weight percent) used was: total starch 92.1% (raw, non-modified cornstarch plus recycled extruded starch sheet, made using the formula of Run 1 above);PVA 2.4%; talc 5.1%; "Myvaplex" 0.2% and Hydrocerol BIH 0.3%. Recycled extruded sheet is the remains of previous extruder test runs. The materials for recycling were first flaked in a flaker and then ground three times to a fine consistency in a Fitz mill. The ground material was blended with fresh material in a ribbon blender; the blend time was standard, about 15 min. The trays made from feed containing recycled extruded sheet were pliable and had a silken feel. Extruder conditions:

Screw configuration #1, Screw RPM 500. Same die as in Run 1. Roller gap 0.203 mm. Roller speed 24 RPM.

(Increased as feed rate increased). Feed rate 63 lb/hr. (Increasing to 101 lbs/hr.)

| Temperatures | Z4 | 180° |
|---|---|---|
| | Z3 | 100° |
| | Z2 | 70° |
| | Z1 | 127° |

Water addition 0.25 lbs/min
Specific Mechanical Energy 0.099

Example 2

Preparation of Loose Fill Packaging Material

A high resiliency (about 85% to about 95%) loose-fill packaging material in the shape of a rod is prepared employing a base mixture having the following components listed as weight %:

| | weight % |
|---|---|
| unmodified corn starch | 77.7 |
| water | 2.8 |
| vegetable oil | 0.97 |
| glycerin | 1.6 |
| polyvinyl alcohol | 4.9 |
| corn meal | 9.7 |
| "Myvaplex" (Trademark, Eastman Kodak, monoglyceride of stearic acid, i.e glycerol monostearate) | 0.39 |
| talc | 1.9 |

The corn starch employed had about 22 wt % amylose and about 8% to about 15% water by weight. The polyvinyl alcohol used had molecular weight range 200,000 to 300,000.

These ingredients, except water, vegetable oil and glycerine were mixed prior to introduction into the extruder. Water, vegetable oil and glycerine were added independently to the extruder through separate inlets. The extruder employed was a Wenger Model TX52 Twin-Screw Extruder (Wenger Manufacturing, Inc. Sabetha, Kans.) which was adapted with feed screws, single lead screws, 5 shear paddles, 10 mixing paddles and a 100 mil diameter die insert to produce a rod-shaped extrudate. The extruder barrel had three temperature zones (150 Z6 [actual temperature 144° C.], 90 Z5 [actual temperature 139° C.] and 70 Z4 [actual temperature not measured]). The screw rpm was 495. The plasticized mass was extruded at a rate of 110 lb/h at 1000 psi and the extrudate was at a temperature of about 175° C. The residence time of the material in the extruder was about 13 seconds.

The extruded material was rolled perpendicular to the direction of extrusion to substantially compress the cells therein. Subsequent to rolling, the stand can be cut into small approximately equal-length segments (about 1 inch in length). The expanded, rolled and cut products were cured at 21° C. in a 50% humidity for 24 h. The cured product had excellent resiliency and abrasion resistance.

Example 3

Laminated "Kraft" (Trademark) Paper for Packaging Applications

A base mixture of this invention is introduced into an extruder, such as the twin-screw extruder described in Example 1, adapted with a flat or slot die to form extruded sheets. The extruded sheets are rolled by rollers, preferably two sets of flat rollers, exerting pressure perpendicular to the extrusion direction and perpendicular to the plane of the sheet. The pressure exerted on the sheet was sufficient to substantially crush the cells in the sheet. The rolled sheet is collected, if desired, by winding onto a roll and is cut along its width to form desired sheet lengths. The rolled sheet material is cured at about room temperature under medium humidity (about 40–60%).

The resulting pliable starch sheet can be directly employed in packaging applications or can be used in laminated packaging products. Laminated packaging products include, among others, "Kraft" paper laminated with pliable starch sheet.

"Kraft" paper is moistened with water, an appropriately sized starch sheet is positioned over the moistened paper and the layered paper and starch sheet are rolled to ensure overall contact and adhesion of the two layers. Additional layers of paper and or starch sheets can be added by similar steps to obtain a multi-layer laminated material. "Kraft" paper with a single layer (about 1/10–about 1/4 inch thick) of starch sheet can be used to fabricate padded envelopes or other mailing containers.

All of the references cited in this specification are incorporated in their entirety by reference herein.

Those of ordinary skill in the art will appreciate that variants, alternatives, substitutes and equivalents of the devices, methods, techniques, expedients, and ingredients specifically described herein may exist and that all such variants, alternatives, substitutes and equivalents that can be employed or readily adapted in the methods and compositions of this invention are within the spirit and scope of this invention which is defined by the appended claims.

We claim:

1. A continuous method for producing a shaped starch article which comprises the steps of:
   a. introducing an extruder feed composition comprising from about 70% to about 97% by weight starch into an extruder;
   b. extruding said composition through a tubular die to generate a tube extrudate;
   c. substantially compressing the tube extrudate to form a sheet; and
   d. shaping the sheet of extrudate to form a shaped article.

2. The method of claim 1 wherein the tube extrudate is substantially compressed by passing said extrudate through a set of rollers to form the sheet of extrudate.

3. The method of claim 2 further wherein the step of shaping said sheet of extrudate comprises pressure molding.

4. The method of claim 3 wherein said shaped article is a tray.

5. The method of claim 1 wherein the tube extrudate is substantially compressed by passing said extrudate through at least one set of rollers, and said rolled extrudate is also stretched.

6. The method of claim 5 wherein the step of shaping said sheet of stretched extrudate comprises pressure molding.

7. The method of claim 6 wherein said article is a tray.

8. The method of claim 1 wherein the tube extrudate is substantially compressed while said extrudate is hot.

9. The method of claim 1 wherein said starch is predominately non-modified starch.

10. The method of claim 1 wherein said starch is non-modified starch.

11. The method of claim 1 wherein said extruder feed composition further comprises less than 5% by weight of a polyol plasticizer.

12. The method of claim 11 wherein said extruder feed composition further comprises less than about 2.5% by weight of a polyol plasticizer.

13. The method of claim 11 wherein said extruder feed further comprises less than 5% by weight of polyvinyl alcohol.

14. The method of claim 1 wherein said extruder feed further comprises a nucleating agent.

15. The method of claim 14 wherein said extruder feed further comprises a lubricant.

16. The method of claim 15 wherein said extruder feed further comprises a humectant.

17. The method of claim 15 wherein said extruder feed further comprises a blowing agent.

18. The method of claim 1 wherein said extruder feed further comprises proteinaceous grain meal.

19. The method of claim 1 wherein said extruder feed comprises one or more different types of starch.

20. The method of claim 1 wherein said extruder feed further comprises glycerin monostearate.

21. The method of claim 1 wherein said extruder feed comprises rice flour.

22. The method of claim 1 wherein said extruder feed comprises a mixture of starch and rice flour.

23. The method of claim 1 wherein said extruder feed comprises recycled expanded compressed starch.

24. The method of claim 1 wherein said starch in said extruder feed is 20% or less by weight recycled expanded compressed starch.

25. The method of claim 23 wherein said starch in said extruder feed is 10% or less by weight recycled expanded compressed starch.

26. The method of claim 1 wherein said extruder composition further comprises talc.

27. The method of claim 1 further comprising a step of stretching said tube extrudate before, after or at the same time it is compressed.

28. The method of claim 27 wherein said tube extrudate is compressed and stretched at the same time.

29. A continuous method for producing a shaped starch article which comprises the steps of:
   a. introducing an extruder feed composition comprising about 70% to about 97% by weight starch into an extruder;
   b. extruding said composition through a tubular die to generate a tube extrudate;
   c. stretching said tube extrudate as it emerges from said die;
   d. substantially compressing said tube extrudate to form a sheet of extrudate; and
   e. shaping said sheet of extrudate into an article.

30. The method of claim 29 wherein said tube extrudate is stretched by pulling it from said die at a rate faster than the rate of extrusion.

31. The method of claim 30 wherein said tube extrudate is stretched at a rate up to about 1.5.

32. The method of claim 30 wherein said tube extrudate is stretched at rate ranging from about 1.1 to about 1.2.

33. The method of claim 29 wherein said starch is predominantly non-modified starch.

34. The method of claim 29 wherein said starch is non-modified starch.

35. A continuous method of pressure molding a shaped starch article which comprises the steps of:
   a. introducing an extruder feed composition comprising from about 70% to about 97% by weight starch into a twin-screw extruder;
   b. extruding said composition through a die to generate a tube extrudate;
   c. after exit from the extruder, substantially compressing the tube extrudate to form a sheet of extrudate; and
   d. introducing said sheet of extrudate into a mold and thereafter forming a shaped expanded starch article.

36. The method of claim 35 wherein said extrudate sheet is produced by rolling said tube extrudate through a set of rollers.

37. The method of claim 36 wherein said article is a tray.

38. The method of claim 35 wherein said extrudate sheet is produced by rolling and stretching said tube extrudate.

39. The method of claim 1 wherein the extruder feed composition further comprises:
   proteinaceous grain meal in an amount ranging from 0% up to about 10% by weight;
   talc in an amount ranging from 0% up to about 10% by weight; and
   a blowing agent in an amount ranging from 0% up to about 1.5% by weight, with the proviso that the extruder feed composition must contain a nucleating agent.

40. The method of claim 39 wherein talc is present in an amount ranging from about 1% up to about 10% by weight.

41. The method of claim 39 wherein talc is present in an amount ranging from about 1% to about 5% by weight.

42. The method of claim 39 which contains no proteinaceous grain meal.

43. The method of claim 39 wherein the proteinaceous grain meal is corn meal.

44. The method of claim 39 wherein said starch is a mixture of starches from different plant sources.

45. The method of claim 39 wherein said starch is non-modified cornstarch.

46. The method of claim 39 wherein said starch comprises rice flour.

47. A shaped starch article produced by the method of claim 1.

48. A starch sheet produced by the method of claim 1.

49. A molded starch article produced by molding of the starch sheet of claim 48.

50. A shaped starch product produced by the method of claim 27.

51. A shaped starch article produced by the method of claim 29.

52. A shaped starch article produced by the method of claim 39.

* * * * *